United States Patent
Miyahara

(10) Patent No.: US 8,116,414 B2
(45) Date of Patent: Feb. 14, 2012

(54) DIVERSITY RECEIVER AND DIVERSITY RECEPTION METHOD

(75) Inventor: Yutaka Miyahara, Saitama (JP)

(73) Assignee: Pioneer Corporation, Tokyo (JP)

( * ) Notice: Subject to any disclaimer, the term of this patent is extended or adjusted under 35 U.S.C. 154(b) by 482 days.

(21) Appl. No.: 12/445,899

(22) PCT Filed: Aug. 24, 2007

(86) PCT No.: PCT/JP2007/066469
§ 371 (c)(1),
(2), (4) Date: Apr. 16, 2009

(87) PCT Pub. No.: WO2008/050532
PCT Pub. Date: May 2, 2008

(65) Prior Publication Data
US 2010/0208835 A1 Aug. 19, 2010

(30) Foreign Application Priority Data
Oct. 17, 2006 (JP) ................. 2006-282884

(51) Int. Cl.
*H04B 7/02* (2006.01)
*H04L 1/02* (2006.01)
(52) U.S. Cl. .............. 375/347; 375/267; 375/349
(58) Field of Classification Search ............ 375/267, 375/347, 349, 350
See application file for complete search history.

(56) References Cited

U.S. PATENT DOCUMENTS

| 5,592,471 | A | * | 1/1997 | Briskman | 455/506 |
|---|---|---|---|---|---|
| 5,646,942 | A | * | 7/1997 | Oliver et al. | 370/312 |
| 5,692,019 | A | * | 11/1997 | Chang et al. | 375/347 |
| 6,148,008 | A | * | 11/2000 | Okamoto | 370/486 |
| 2002/0118782 | A1 | * | 8/2002 | Ohsawa | 375/347 |

FOREIGN PATENT DOCUMENTS
JP 09-247066 A 9/1997

* cited by examiner

*Primary Examiner* — David Lugo
(74) *Attorney, Agent, or Firm* — Arent Fox LLP

(57) ABSTRACT

An orthogonal signal from a modulated signal of the digital terrestrial broadcast is produced. Then, an adder carrier-combines the orthogonal signal and an interpolated signal into an interpolated orthogonal signal, which is in turn demodulated by a DQPSK demodulation section. A demodulated signal is produced from a modulated signal of the digital satellite broadcast. A transmission path coding section produces transport stream data. A DQPSK mapping section re-demodulates the transport stream data to produce an orthogonal signal. A sync detection section asynchronously detects a demodulated signal demodulated by the DQPSK demodulation section and a demodulated signal produced by a time deinterleave section in the transmission path coding section. The detected time difference is set as a delay time of a delay circuit so as to delay the orthogonal signal, thereby producing the interpolated signal to be carrier-combined by the adder in order to provide improved reception quality.

7 Claims, 3 Drawing Sheets

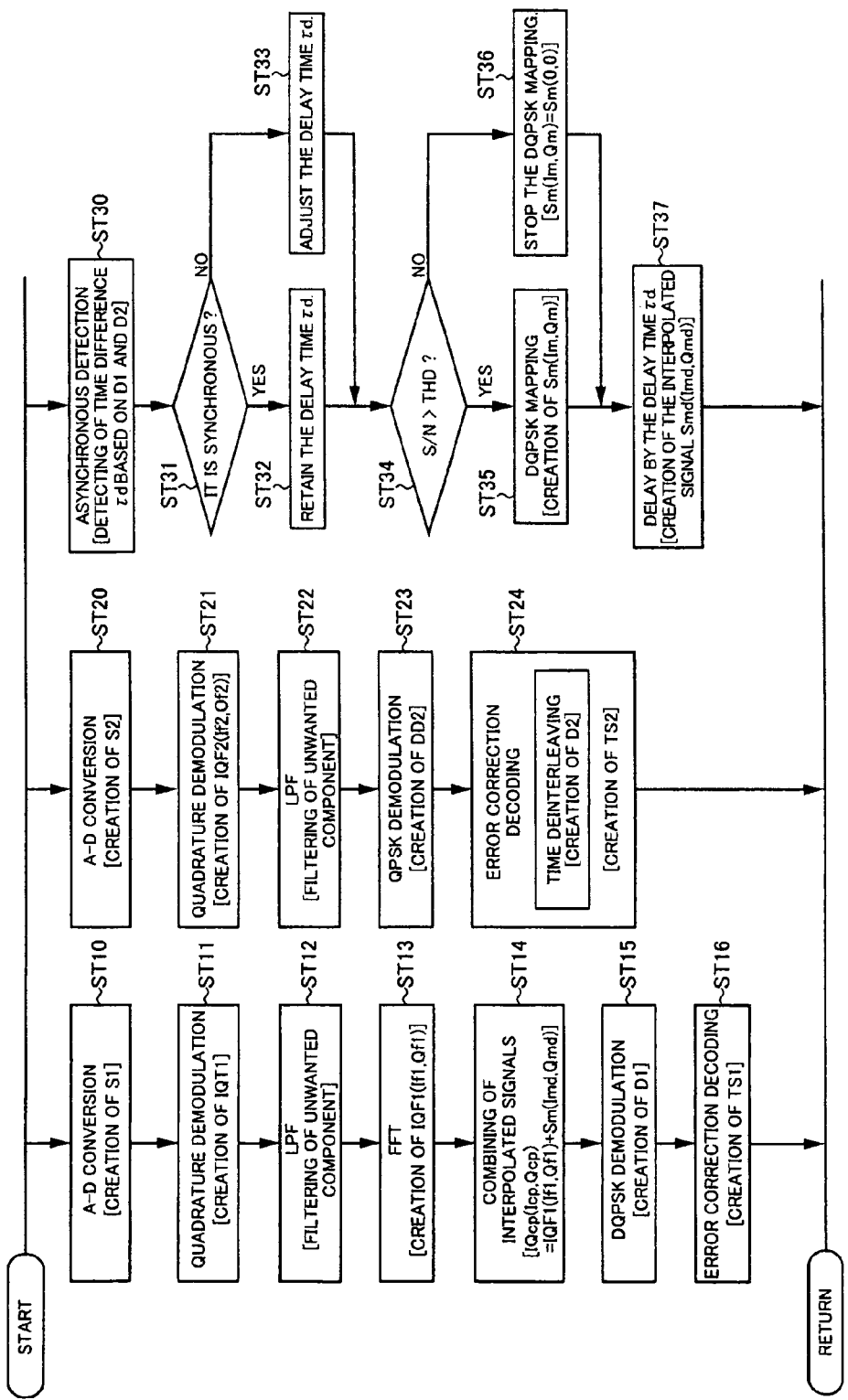

DIVERSITY RECEIVER AND DIVERSITY RECEPTION METHOD

CROSS-REFERENCE TO RELATED APPLICATION

This application is a National Stage entry of International Application No. PCT/JP2007/66469, filed Aug. 24, 2007, the disclosure of the prior application is hereby incorporated in its entirety by reference.

BACKGROUND OF THE INVENTION

1. Field of the Invention

The present invention relates to a diversity receiver and a diversity reception method which enable diversity reception of a plurality of digital broadcasts, for example, such as a digital satellite broadcast and a digital terrestrial broadcast that employ different transmission path coding schemes or the like.

2. Description of the Related Art

Conventional diversity receivers have employed the radio reception technology according to the diversity combining scheme in order to improve reception quality or the like (See FIG. 1 in Patent Document 1).

The diversity radio receiver disclosed in Patent Document 1 is configured such that when incoming radio waves are received with a plurality of reception antennas thereof and then converted into a baseband frequency signal (desired signal) for demodulation, the plurality of desired signals are carrier combined, and then the combined desired signal is demodulated. When those incoming radio waves which have been adversely affected by multipath fading or the like are received with part of the signal components of a desired signal dropped out, a configuration of this type allows the carrier combining to interpolate the dropped signal component and increase the signal level. This makes it possible, for example, to reduce demodulation errors and improve the S/N ratio (signal-to-noise ratio) of the demodulated signal.

[Patent Document 1] Japanese Patent Application Laid-Open No. Hei 9-247066

SUMMARY OF THE INVENTION

The receiver of the conventional diversity combining scheme employs a plurality of reception antennas for receiving incoming radio waves. To this end, only radio waves (such as broadcast waves) on a particular channel (physical channel) selected by a user or the like are selectively received and then carrier combined as described above. Therefore, this does not imply that a plurality of broadcasts according to different transmission path coding schemes or the like are received for carrier combining of the desired signals of each broadcast. But, it is meant that the desired signals of only the same broadcast are carrier combined.

However, recent digital broadcast systems have started to offer such broadcast services that enable a digital terrestrial broadcast and a digital satellite broadcast according to different transmission path coding schemes or the like to simulcast the same broadcast program during the same time frame. These broadcast services then allow the receiver to be switched to receive either one of the broadcasts that may provide better reception quality depending on changes in reception environments.

For example, in U.S.A., Sirius (Sirius Satellite Radio Inc.) has started to provide a broadcast service of this type for those users who receive it with an on-board mobile receiver located on their automobiles. While travelling through urban areas where there are a number of high-rise buildings, they select to receive the digital terrestrial broadcast which provides better reception quality. On the other hand, when travelling through areas in a clear line-of-sight with few buildings, they select to receive the digital satellite broadcast that provides better reception quality. Thus, this service always enables seamless reception with good reception quality.

Here, the simulcast of such digital terrestrial broadcast and digital satellite broadcast is received by a diversity combining scheme receiver to carrier combine the desired signal obtained by receiving the digital terrestrial broadcast and the desired signal obtained by receiving the digital satellite broadcast. It is thus thought that demodulating the resulting combined signal can make significant improvements in antifading characteristics or the like and hence reception quality.

That is, the receiver of the conventional diversity combining scheme can selectively receive only the digital terrestrial broadcast or the digital satellite broadcast alone, and then carrier combine the desired signals of only one of the broadcasts that has been selectively received. However, the digital terrestrial broadcast and the digital satellite broadcast, which simulcast the same broadcast program during the same time frame, may be selectively received, so that the desired signals of both the broadcasts are carrier combined for demodulation. In this case, for example, a signal component dropped out of the desired signal of the digital terrestrial broadcast could be interpolated using the desired signal of the digital satellite broadcast. It can be thus thought to provide significantly improved antifading characteristics or the like and hence reception quality.

However, since the digital satellite broadcast and the digital terrestrial broadcast employ different transmission path coding schemes or the like, it is difficult for the receiver of the conventional diversity combining scheme to carrier synchronize both the desired signals for carrier combining. Additionally, the fact that the digital satellite broadcast and the digital terrestrial broadcast take different radio transmission paths also causes both the desired signals to be carrier synchronized and carrier combined with difficulty. Thus, even seemingly successful carrier combining creates false signals combined together, making it difficult to improve reception quality.

The present invention was developed in view of new technical challenges of providing diversity in receiving simulcasts according to different transmission path coding schemes or the like to make further improvements in reception quality. It is therefore an object of the present invention to provide a diversity receiver and a diversity reception method which enable carrier synchronization of desired signals for carrier combining.

The invention according to claim 1 relates to a diversity receiver for receiving a simulcast with a plurality of reception antennas. The diversity receiver includes: a first reception branch for receiving one broadcast of the simulcast to produce a modulated signal; a second reception branch for receiving the other broadcast of the simulcast to produce a modulated signal; first demodulator means for producing an orthogonal signal from the modulated signal produced in the first reception branch to supply the resulting signal to third demodulator means via adder means; second demodulator means for demodulating the modulated signal produced in the second reception branch to produce a demodulated signal; transmission path decode means for performing error correction decoding on the demodulated signal produced by the second demodulator means; re-modulation means for re-modulating a signal having been subjected to the error correction decoding by the transmission path decode means to produce an orthogonal signal; time adjustment means for asynchronously detecting a demodulated signal having been time-deinterleaved when the transmission path decode means performs the error correction decoding and a demodulated signal having been demodulated by the third demodulator means, employing a time difference between both the demodulated signals as a delay time to delay by the delay time the orthogonal signal produced by the re-modulation means, and thereby producing an interpolated signal; and the adder means for carrier combining the interpolated signal and the orthogonal signal produced by the first demodulator means to thereby produce an interpolated orthogonal signal, which is in turn supplied to the third demodulator means. The receiver is characterized in that the third demodulator means performs demodulation in conformity with the carrier modulation scheme for the one broadcast, and the re-modulation means performs re-modulation in conformity with the carrier modulation scheme for the one broadcast.

BRIEF DESCRIPTION OF THE DRAWINGS

These and other objects and advantages of the present invention will become clear from the following description with reference to the accompanying drawings, wherein:

FIG. 3 shows an explanatory flowchart for the operation of the diversity receiver shown in FIG. 2.

DETAILED DESCRIPTION OF THE PREFERRED EMBODIMENTS

Figure 1:
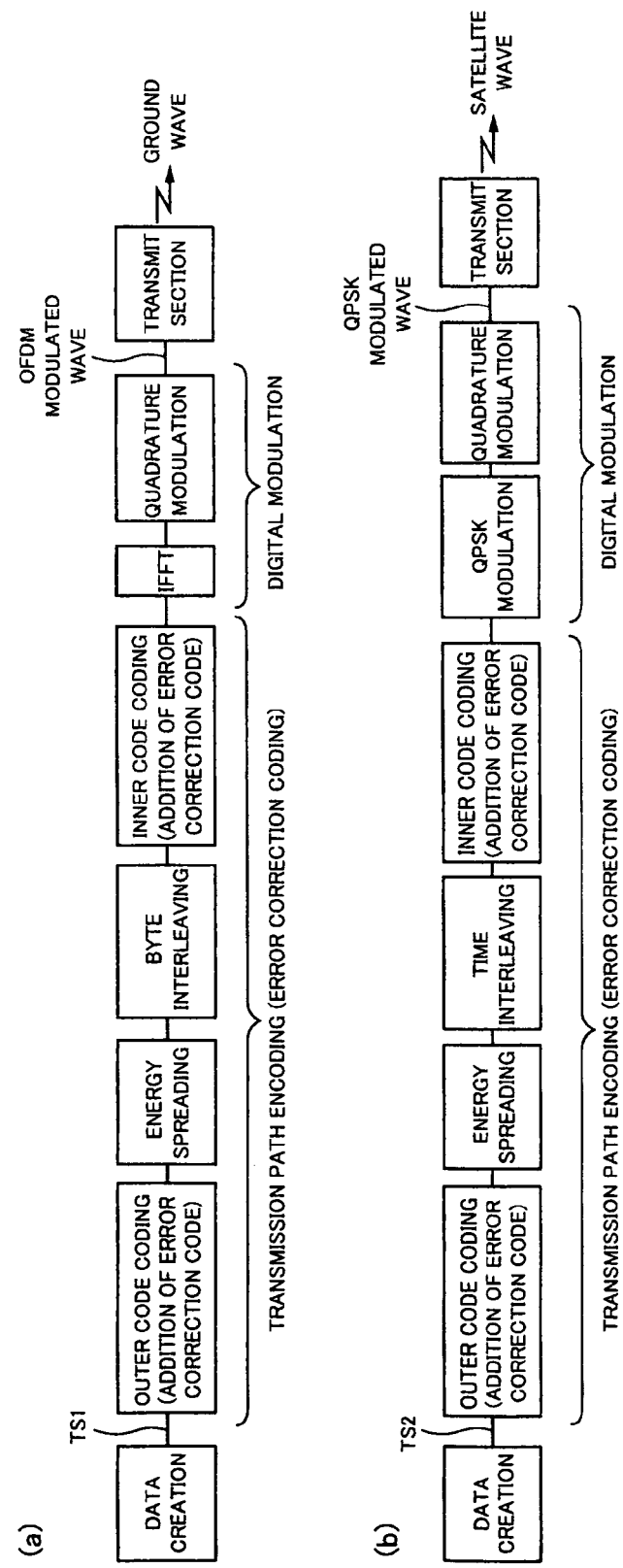
FIG. 1 a block diagram illustrating in outline the configuration of a transmitter at a broadcast station which transmits digital satellite broadcasts and digital terrestrial broadcasts.
Figure 2:
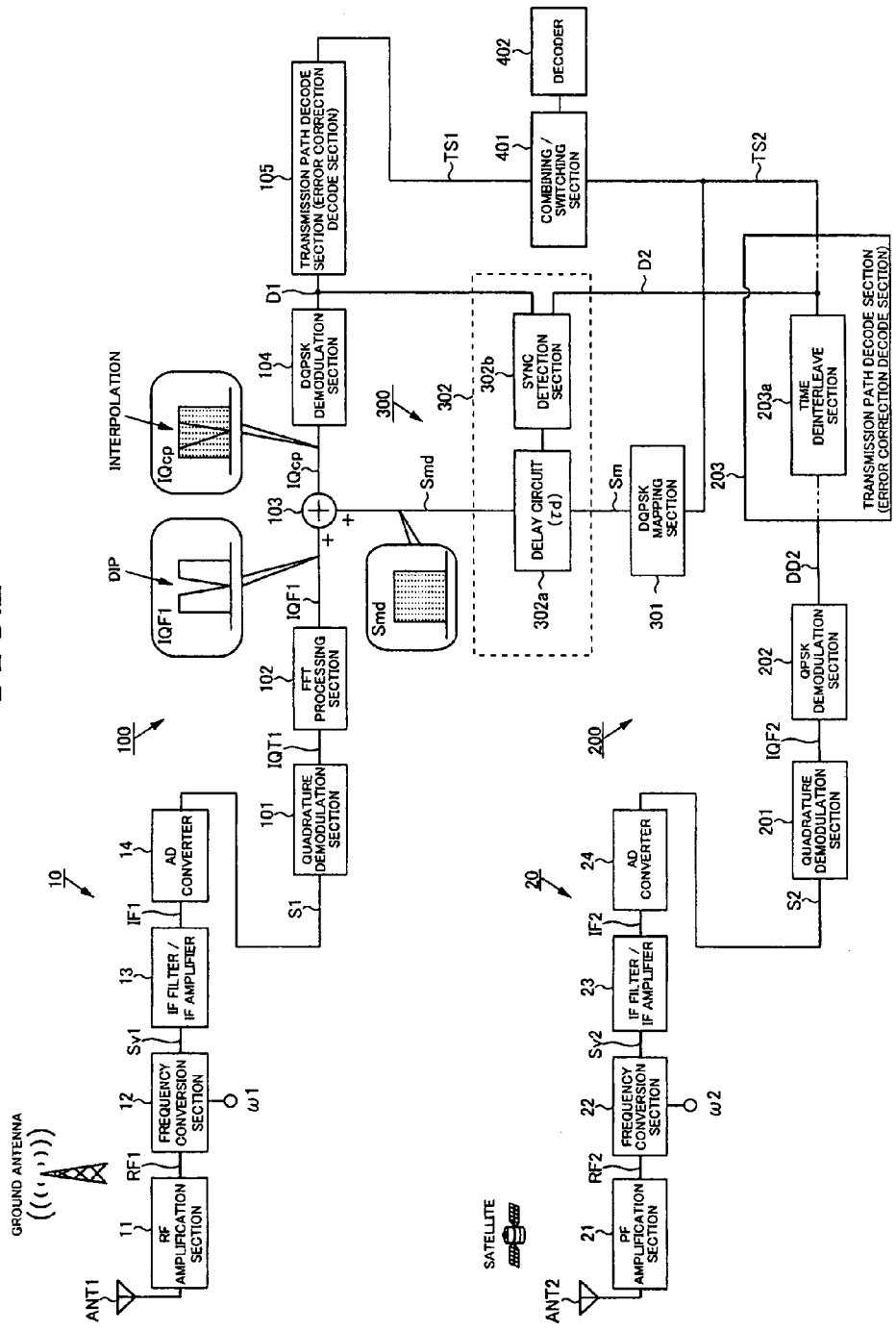
FIG. 2 is a block diagram illustrating the configuration of a diversity receiver according to an embodiment.

Now, with reference to FIGS. 1, 2, and 3, a description will be given to a preferred embodiment of the present invention. FIG. 1 is a block diagram illustrating in outline the configuration of a transmitter at a broadcast station which simulcasts digital terrestrial broadcasts and digital satellite broadcasts. FIG. 2 is a block diagram illustrating the configuration of a diversity receiver according to the present embodiment. FIG. 3 is a flowchart for describing the operation of the diversity receiver.

Note that the description will be made to a diversity receiver which receives the simulcasts of a digital terrestrial broadcast based on the OFDM (Orthogonal Frequency Division Multiplexing) modulation scheme and a digital satellite broadcast based on the QPSK (Quadrature Phase Shifting Keying) modulation scheme.

First, with reference to FIG. 1, the configuration of the transmitter at a broadcast station will be outlined below.

The broadcast station includes a transmitter for transmitting digital satellite broadcasts as shown in FIG. 1(a) and a transmitter for transmitting digital terrestrial broadcasts as shown in FIG. 1(b).

The transmitter for transmitting digital terrestrial broadcasts encodes broadcast programs (contents) in conformity with a predetermined information source encoding scheme such as MPEG-2 Video or MPEG-2 Audio, thereby producing data, i.e., transport stream data TS1. The data is then subjected to transmission path encoding such as outer code coding, energy spreading, byte interleaving, and inner code coding, and thereafter to digital modulation such as IFFT (inverse fast Fourier transform) and quadrature modulation. This allows for producing an OFDM modulated wave which has been DQPSK (Differential Quadrature Phase Shift Keying) carrier modulated. The resulting OFDM modulated wave is converted at the transmit section into a ground wave, which is in turn broadcast to the receiver via the ground antenna.

The transmitter for transmitting digital satellite broadcasts encodes broadcast programs (contents) in conformity with a predetermined information source encoding scheme such as MPEG-2 Video and MPEG-2 Audio, thereby producing data, i.e., transport stream data TS2. The data is then subjected to transmission path encoding such as outer code coding, energy spreading, time interleaving, and inner code coding, and thereafter to digital modulation such as QPSK modulation and quadrature modulation. This allows for producing a QPSK modulated wave, which is turned to a satellite wave at the transmit section for broadcasting to the receiver via a satellite.

Then, to simulcast the same broadcast program within the same time frame, the transmitter for transmitting digital terrestrial broadcasts and the transmitter for transmitting digital satellite broadcasts broadcast the transport stream data TS1 and TS2 of the same broadcast program during the same time frame as the digital satellite broadcast and the digital terrestrial broadcast, respectively.

Furthermore, in general, the broadcast station transmits the digital terrestrial broadcast later than the digital satellite broadcast. Accordingly, when the same broadcast programs are simulcast within the same time frame and actually received by the receiver via the reception antenna, the digital satellite broadcast is received and then the digital terrestrial broadcast is received with delay.

Now, with reference to FIG. 2, a description will be made to the configuration of the diversity receiver of the present embodiment.

The diversity receiver of the present embodiment is configured to include a first reception branch 10 and a first demodulation branch 100 for receiving the digital terrestrial broadcast, a second reception branch 20 and a second demodulation branch 200 for receiving the digital satellite broadcast, an interpolation system 300 for producing an interpolated signal Smd, a combining/switching section 401, and a decoder 402.

The first reception branch 10 is configured to include a reception antenna ANT1 for receiving ground waves; an RF amplification section 11 for selecting a high-frequency received signal RF1 from the output of the reception antenna ANT1; a frequency conversion section 12 for frequency-converting the received signal RF1 to an intermediate frequency signal Sv1 by mixture detection of the received signal RF1 and a predetermined local signal $\omega 1$; an IF filter/IF amplifier 13 for extracting from the intermediate frequency signal Sv1 an OFDM modulated wave (baseband signal) IF1, which has been DQPSK carrier modulated; and an AD converter 14 for analog-digital conversion of the OFDM modulated wave IF1 to an OFDM modulated signal S1 of digital data.

The second reception branch 20 is configured to include a reception antenna ANT2 for receiving satellite waves; an RF amplification section 21 for selecting a high-frequency received signal RF2 from the output of the reception antenna ANT2; a frequency conversion section 22 for frequency-converting the received signal RF2 to an intermediate frequency signal Sv2 by mixture detection of the received signal RF2 and a predetermined local signal $\omega 2$; an IF filter/IF amplifier 23 for extracting a QPSK modulated wave (baseband signal) IF2 from the intermediate frequency signal Sv2; and an AD converter 24 for analog-digital conversion of a QPSK modulated wave IF1 to a QPSK modulated signal S2 of digital data.

The first demodulation branch 100 is configured to include a quadrature demodulation section 101, an FFT processing section 102, an adder 103, a DQPSK demodulation section 104, and a transmission path decode section (error correction decode section) 105.

In this configuration, the quadrature demodulation section 101 performs orthogonal transform on the OFDM modulated signal S1 into a complex signal IQT1 of 0IF, and the FFT processing section 102 performs Fourier transform on the complex signal IQT1, thereby producing an orthogonal signal IQF1. The adder 103 performs carrier combining (addition) on the orthogonal signal IQF1 and the interpolated signal Smd, described later, to thereby produce an interpolated orthogonal signal IQcp. The DQPSK demodulation section 104 performs DQPSK demodulation on the interpolated orthogonal signal IQcp to thereby produce a demodulated signal D1. The transmission path decode section 105 performs, on the demodulated signal D1, transmission path decoding such as inner code decoding, byte deinterleaving, inverse energy spreading, and outer code decoding, thereby producing the transport stream data TS1.

The second demodulation branch 200 is configured to include a quadrature demodulation section 201, a QPSK demodulation section 202, and a transmission path decode section 203.

In this configuration, the quadrature demodulation section 201 performs orthogonal transform on the modulated wave IF2 into an orthogonal signal IQF2 of 0IF, and the QPSK demodulation section 202 performs QPSK demodulation on the orthogonal signal IQF2 to thereby produce a demodulated signal DD2. A transmission path decode section 203 performs, on the demodulated signal DD2, transmission path decoding such as inner code decoding, time deinterleaving, inverse energy spreading, and outer code decoding, thereby producing the transport stream data TS2.

The interpolation system 300 is configured to include a DQPSK mapping section 301 serving as re-modulation means, and a time adjustment section 302 which has a delay circuit 302a and a sync detection section 302b.

The DQPSK mapping section 301 maps the transport stream data TS2 corresponding to the I-Q constellation of the DQPSK modulation, thereby producing an orthogonal signal Sm that is made up of an in-phase component Im and an orthogonal component Qm.

The sync detection section 302b of the time adjustment section 302 receives the demodulated signal D1 produced by the DQPSK demodulation section 104 and a demodulated signal D2 that has been time-deinterleaved by a time deinterleave section 203a in the transmission path decode section 203. The sync detection section 302b then asynchronously detects a frame sync signal contained in every one frame period of each of the demodulated signals D1 and D2, thereby detecting a time difference τd between the frame sync signals of both the signals D1 and D2. Here, since the digital terrestrial broadcast is transmitted later than the digital satellite broadcast, the time difference τd is detected as a delay time of the demodulated signal D2 relative to the demodulated signal D1.

The delay circuit 302a of the time adjustment section 302 defines, as a delay time τd, the time difference τd detected by the sync detection section 302b and delays the orthogonal signal Sm by the delay time τd. Then, the in-phase component Im and the orthogonal component Qm of the delayed orthogonal signal Sm are supplied to an adder 15 as the in-phase component Imd and the orthogonal component Qmd of the interpolated signal Smd.

Then, the adder 15 performs carrier combining on the in-phase component Imd of the interpolated signal Smd and an in-phase component If1 of the orthogonal signal IQF1 to thereby produce an in-phase component Icp of the interpolated orthogonal signal IQcp. The adder 15 also performs carrier combining on the orthogonal component Qmd of the interpolated signal Smd and an orthogonal component Qf1 of the orthogonal signal IQF1 to thereby produce an orthogonal component Qcp of the interpolated orthogonal signal IQcp.

The combining/switching section 401 selects either one of the transport stream data TS1 or TS2 for output, or alternatively combines the transport stream data TS1 and TS2 for output. Although not detailed herein, suppose that a check on the receive sensitivity of the digital terrestrial broadcast and the digital satellite broadcast may shows that the receive sensitivity of the digital terrestrial broadcast is good but the receive sensitivity of the digital satellite broadcast has deteriorated. In this case, the transport stream data TS1 is delivered, or alternatively, the transport stream data TS1 and TS2 is combined together for output. On the other hand, if the receive sensitivity of the digital terrestrial broadcast has deteriorated and the receive sensitivity of the digital satellite broadcast is good, the transport stream data TS2 is delivered, or alternatively, the transport stream data TS1 and TS2 is combined together for output.

The decoder 402 receives transport stream data delivered from the combining/switching section 401, and the data is decoded in conformity with a predetermined information source encoding scheme such as MPEG-2 Video or MPEG-2 Audio, thereby reproducing the broadcast program (contents).

Now, with reference to FIG. 3, a description will be given to the operation of the diversity receiver of the present embodiment configured as described above.

Note that FIG. 3 shows the processing that is conducted by the first and second demodulation branches 100 and 200 and the interpolation system 300 each time the AD converters 14 and 24 perform analog-digital conversion of the OFDM modulated wave IF1 and the QPSK modulated wave IF2 into the OFDM modulated signal S1 and the QPSK modulated signal S2 at a predetermined sampling cycle T.

First, the operation of the first demodulation branch 100 will be described.

In step ST10, the AD converter 14 performs analog-digital conversion of the OFDM modulated wave IF1, which has been DQPSK carrier modulated, into the OFDM modulated signal S1. Then in steps ST11 and ST12, the quadrature demodulation section 101 performs orthogonal transform on the OFDM modulated signal S1 to thereby produce the complex signal IQT1, and as well filters out unwanted components contained in the complex signal IQT1 by low-pass filtering.

Then, in step ST13, the FFT processing section 102 performs Fourier transform on the complex signal IQT1 to thereby produce the orthogonal signal IQF1 that is made up of the in-phase component If1 and the orthogonal component Qf1 as expressed by Equation (1) below.

[Equation 1]

$$IQF1 = (If1, Qf1) \quad (1)$$

Then, in step ST14, the orthogonal signal IQF1 and the interpolated signal Smd produced in step ST37, to be discussed later, are carrier combined to thereby produce the interpolated orthogonal signal IQcp. That is, as expressed by Equations (2a) and (2b) below, the in-phase component If1 of the orthogonal signal IQF1 and the in-phase component Imd of the interpolated signal Smd are combined together, thereby producing the in-phase component Icp of the interpolated orthogonal signal IQcp. In addition, the orthogonal component Qf1 of the orthogonal signal IQF1 and the orthogonal component Qmd of the interpolated signal Smd are combined together, thereby producing the orthogonal component Qcp of the interpolated orthogonal signal IQcp.

[Equation 2]

$$Icp = If1 + Imd \quad (2a)$$

$$Qcp = Qf1 + Qmd \quad (2b)$$

In this manner, for example, when the ground waves of the digital terrestrial broadcast have been adversely affected by multipath fading or the like causing a dropped signal component (dip) to occur in part of the orthogonal signal IQF1, the orthogonal signal IQF1 and the interpolated signal Smd can be combined together to thereby interpolate the dropped signal component.

Then, in step ST15, the DQPSK demodulation section 104 performs DQPSK demodulation on the interpolated orthogonal signal IQcp, thereby producing the demodulated signal D1.

Then, in step ST16, the transmission path decode section 105 performs error correction decoding on the demodulated signal D1, thereby producing the transport stream data TS1.

Then, each time the AD converter 14 performs analog-digital conversion of the OFDM modulated wave IF1 into the OFDM modulated signal S1 in step ST10, the process is repeated in steps ST11 to ST16.

Now, a description will be made to the operation of the second demodulation branch 200.

In step ST20, the AD converter 24 performs analog-digital conversion of the QPSK modulated wave IF2 into the QPSK modulated signal S2. Then in steps ST21 and ST22, the quadrature demodulation section 201 performs orthogonal transform on the QPSK modulated signal S2 to thereby produce the orthogonal signal IQF2, and as well filters out unwanted components contained in the orthogonal signal IQF2 by low-pass filtering.

Then, in step ST23, the QPSK demodulation section 202 performs QPSK demodulation on the orthogonal signal IQF2 to thereby produce the demodulated signal DD2.

Then, in step ST24, the transmission path decode section 203 performs error correction decoding on the demodulated signal DD2, thereby producing the transport stream data TS2. Furthermore, during the error correction decoding, the demodulated signal D2, which is produced through time deinterleaving by the time deinterleave section 203a, is supplied to the sync detection section 302b.

Then, each time the AD converter 24 performs analog-digital conversion of the QPSK modulated wave IF2 into the QPSK modulated signal S2 in step ST20, the process is repeated in steps ST21 to ST24.

Now, a description will be made to the operation of the interpolation system 300.

In step ST30, the sync detection section 302b asynchronously detects a frame sync signal contained in the demodulated signals D1 and D2, thereby detecting the time difference τd between both the frame sync signals. That is, since the digital terrestrial broadcast is transmitted later than the digital satellite broadcast, the delay time of the digital terrestrial broadcast is detected with respect to the digital satellite broadcast. Furthermore, when the digital satellite broadcasting and the digital terrestrial broadcast have been adversely affected by multipath fading or the like causing a delay in their propagation, the delay time of the digital terrestrial broadcast relative to the digital satellite broadcast is to be detected including their delay time.

Then, in step ST31, the sync detection section 302b also determines whether the time difference τd is zero, i.e., the demodulated signals D1 and D2 are in sync with each other. If it is determined that they are synchronous, then the process proceeds to step ST32, where the delay time τd of the delay circuit 302a is maintained as it is. On the other hand, if it is determined that they are not synchronous, then the process proceeds to step ST33, where the delay time τd of the delay circuit 302a is set (updated) to the time difference τd that has been asynchronously detected.

Then, in step ST34, the DQPSK mapping section 301 checks the S/N ratio (signal-to-noise ratio) of the demodulated signal D2 supplied from the time deinterleave section 203a for comparison with a predetermined threshold value THD. If the comparison shows that the S/N ratio is greater than the threshold value THD, then the S/N ratio of the demodulated signal D2 is determined to be good. Subsequently, the process proceeds to step ST35, where DQPSK mapping is performed to produce the orthogonal signal Sm that is made up of the in-phase component Im and the orthogonal component Qm as expressed by Equation (3) below.

[Equation 3]

$$Sm = (Im, Qm) \quad (3)$$

On the other hand, if the S/N ratio is lower than the threshold value THD, then the process determines that the demodulated signal D2 has a bad S/N ratio, and proceeds to step ST36 to stop the DQPSK mapping. As expressed by Equation (4) below, this allows the orthogonal signal Sm to be produced in which both the in-phase component Im and the orthogonal component Qm are zero. That is, the in-phase component Im and the orthogonal component Qm being 0 means that no orthogonal signal Sm is substantially produced.

[Equation 4]

$$Sm = (Im, Qm) = (0,0) \quad (4)$$

Then, in step ST37, the delay circuit 302a delays the orthogonal signal Sm by the aforementioned delay time τd, and supplies to the adder 103 the delayed interpolated signal Smd that is made up of the in-phase component Imd and the orthogonal component Qmd. Subsequently, the interpolated signal Smd in synch with the orthogonal signal IQF1 is supplied to the adder 103, and in step ST14 mentioned above, the adder 103 performs carrier combining on the orthogonal signal IQF1 and the interpolated signal Smd, thereby producing the interpolated orthogonal signal IQcp. Then, the processing is repeated in steps ST30 to ST37. As described above, the diversity receiver of the present embodiment provides the following advantages.

First, as shown in FIG. 2, the sync detection section 302b asynchronously detects the demodulated signal D1 and the demodulated signal D2 to thereby detect the time difference (shift in synchronization) τd between the demodulated signals D1 and D2. Here, the demodulated signal D1 is produced at the DQPSK demodulation section 104 in the first demodulation branch 100 for demodulating the digital terrestrial broadcast. The demodulated signal D2 has been time-deinterleaved at the transmission path decode section 203 in the second demodulation branch 200 for demodulating the digital satellite broadcast.

Then, the DQPSK mapping section 301 performs mapping based on the transport stream data TS2 that has been subjected error correction decoding at the transmission path decode section 203 in the second demodulation branch 200, thereby producing the orthogonal signal Sm that has the same quality as that of the orthogonal signal IQF1 which has been DQPSK carrier modulated. Moreover, the delay circuit 302a delays the orthogonal signal Sm by the delay time τd that is set based on the time difference (shift in synchronization) τd between the demodulated signals D1 and D2, thereby making it possible to produce the interpolated signal Smd in synch with the orthogonal signal IQF1 and supply the resulting signal to the adder 103.

Thus, for example, when the digital terrestrial broadcast has been adversely affected by multipath fading or the like, resulting in a dropped signal component (dip) occurring in part of the orthogonal signal IQF1, the adder 103 combines the orthogonal signal IQF1 and the interpolated signal Smd together, thereby allowing for interpolating the dropped signal component. It is also possible to improve the S/N ratio of the transport stream data TS1 that is produced via the DQPSK demodulation section 104 and the transmission path decode section 105. Furthermore, the transport stream data TS1 is supplied to the decoder 402 via the combining/switching section 401, thereby making it possible to reproduce broadcast programs (contents) with good quality.

As such, according to the diversity receiver of the present embodiment, it is possible to provide diversity in reception of a simulcast according to different transmission path coding schemes or the like and carrier synchronize the desired signals for carrier combining, thereby providing improved reception quality.

Note that the diversity receiver of the present embodiment described above is adapted to receive the digital terrestrial broadcast that contains the OFDM modulated wave, modulated by the DQPSK carrier, which is transmitted on radio waves from the broadcast station. The receiver also receives the digital satellite broadcast that contains the QPSK modulated wave, QPSK modulated, which is transmitted on radio waves. However, suppose that the OFDM modulated wave has been modulated according to another carrier modulation scheme, for example, according to any carrier modulation scheme of the QPSK modulation scheme, the 16QAM (16 Quadrature Amplitude Modulation) modulation scheme, and the 64QAM (64 Quadrature Amplitude Modulation) modulation scheme. In this case, the DQPSK mapping section 301 may be adapted to conduct mapping corresponding to the I-Q constellation in conformity with that carrier modulation scheme. Furthermore, the DQPSK demodulation section 104 may also be adapted to conduct demodulation in conformity with that carrier modulation scheme. That is, for example, when the OFDM modulated wave has been modulated by the 16QAM modulation scheme, the DQPSK mapping section 301 may be replaced with the 16QAM mapping section, allowing the DQPSK demodulation section 104 to be the 16QAM demodulation section.

Furthermore, when a modulated wave that has been modulated according to a modulation scheme other than the QPSK modulation scheme is transmitted on radio waves as the digital satellite broadcast from the broadcast station, the QPSK demodulation section 202 may be adapted to perform demodulation in conformity with that modulation scheme.

Furthermore, in the descriptions above, the first and second demodulation branches 100 and 200 and the interpolation system 300, which are located downstream of the AD converters 14 and 24, are implemented using digital circuits (hardware). However, it is also acceptable to create a computer program that provides the same functions as those of these branches and system, thereby allowing the computer program to be executed by digital signal processors (DSP) or microprocessors (MPU).

While there has been described what are at present considered to be preferred embodiments of the present invention, it will be understood that various modifications may be made thereto, and it is intended that the appended claims cover all such modifications as fall within the true spirit and scope of the present invention.

The invention claimed is:

1. A diversity receiver for receiving a simulcast with a plurality of reception antennas, said diversity receiver comprising:
   a first reception branch for receiving one broadcast of said simulcast to produce a modulated signal;
   a second reception branch for receiving the other broadcast of said simulcast to produce a modulated signal;
   first demodulator means for producing an orthogonal signal from said modulated signal produced in said first reception branch to supply the resulting signal to third demodulator means via adder means;
   second demodulator means for demodulating said modulated signal produced in said second reception branch to produce a demodulated signal;
   transmission path decode means for performing error correction decoding on said demodulated signal produced by said second demodulator means;
   re-modulation means for re-modulating a signal having been subjected to said error correction decoding by said transmission path decode means to produce an orthogonal signal;
   time adjustment means for asynchronously detecting a demodulated signal having been time-deinterleaved when said transmission path decode means performs said error correction decoding and a demodulated signal having been demodulated by said third demodulator means, employing a time difference between both the demodulated signals as a delay time to delay by said delay time said orthogonal signal produced by said re-modulation means, and thereby producing an interpolated signal; and
   said adder means for carrier combining said interpolated signal and said orthogonal signal produced by said first demodulator means to thereby produce an interpolated orthogonal signal, which is in turn supplied to said third demodulator means,
   wherein said third demodulator means performs demodulation in conformity with the carrier modulation scheme for said one broadcast, and
   wherein said re-modulation means performs re-modulation in conformity with the carrier modulation scheme for said one broadcast.

2. The diversity receiver according to claim 1, wherein
   said one broadcast is a digital terrestrial broadcast for transmitting on ground waves an OFDM modulated wave having been DQPSK carrier modulated and OFDM modulated,
   said other broadcast is a digital satellite broadcast for transmitting a QPSK modulated wave having been QPSK modulated on radio waves,
   said first reception branch receives the one broadcast of said simulcast to produce said modulated signal having been subjected to said DQPSK carrier modulation, and
   said second reception branch receives the other broadcast of said simulcast to produce said modulated signal having been subjected to said QPSK modulation.

3. The diversity receiver according to claim 2, wherein
said third demodulator means performs demodulation in conformity with a DQPSK carrier modulation scheme, and
said re-modulation means performs re-modulation in conformity with a DQPSK carrier modulation scheme.

4. The diversity receiver according to claim 1, further comprising
another transmission path decode means for performing error correction decoding on said demodulated signal demodulated by said third demodulator means.

5. The diversity receiver according to claim 4, further comprising
combining switching means for selectively outputting a signal on which said transmission path decode means has performed said error correction decoding and a signal on which said another transmission path decode means has performed said error correction decoding, or alternatively for combining the signals together for output.

6. The diversity receiver according to claim 5, further comprising
a decoder for decoding said output from said combining switching means to reproduce a broadcast program.

7. A diversity reception method for receiving a simulcast with a plurality of reception antennas, the method comprising:
a first reception step of receiving one broadcast of said simulcast to produce a modulated signal;
a second reception step of receiving the other broadcast of said simulcast to produce a modulated signal;
a first demodulation step of producing an orthogonal signal from said modulated signal produced in said first reception step to allow the resulting orthogonal signal to be processed in a third demodulation step via an addition step;
a second demodulation step of demodulating said modulated signal produced in said second reception step to produce a demodulated signal;
a transmission path decode step of performing error correction decoding on said demodulated signal produced in said second demodulation step;
a re-modulation step of re-modulating a signal having been subjected to said error correction decoding in said transmission path decode step to produce an orthogonal signal;
a time adjustment step of asynchronously detecting a demodulated signal having been time-deinterleaved when said error correction decoding is performed in said transmission path decode step and a demodulated signal demodulated in said third demodulation step to determine a time difference between both the demodulated signals as a delay time, and delaying by said delay time said orthogonal signal produced in said re-modulation step, thereby producing the interpolated signal; and
said addition step of carrier combining of said interpolated signal and said orthogonal signal produced in said first demodulation step to thereby produce an interpolated orthogonal signal, which is then processed into said third demodulation step,
wherein said third demodulation step performs demodulation in conformity with a carrier modulation scheme for said one broadcast, and
wherein said re-modulation step performs re-modulation in conformity with a carrier modulation scheme for said one broadcast.

* * * * *